Aug. 4, 1964   D. W. MORGAN   3,143,035
PROJECTOR
Filed Feb. 19, 1962
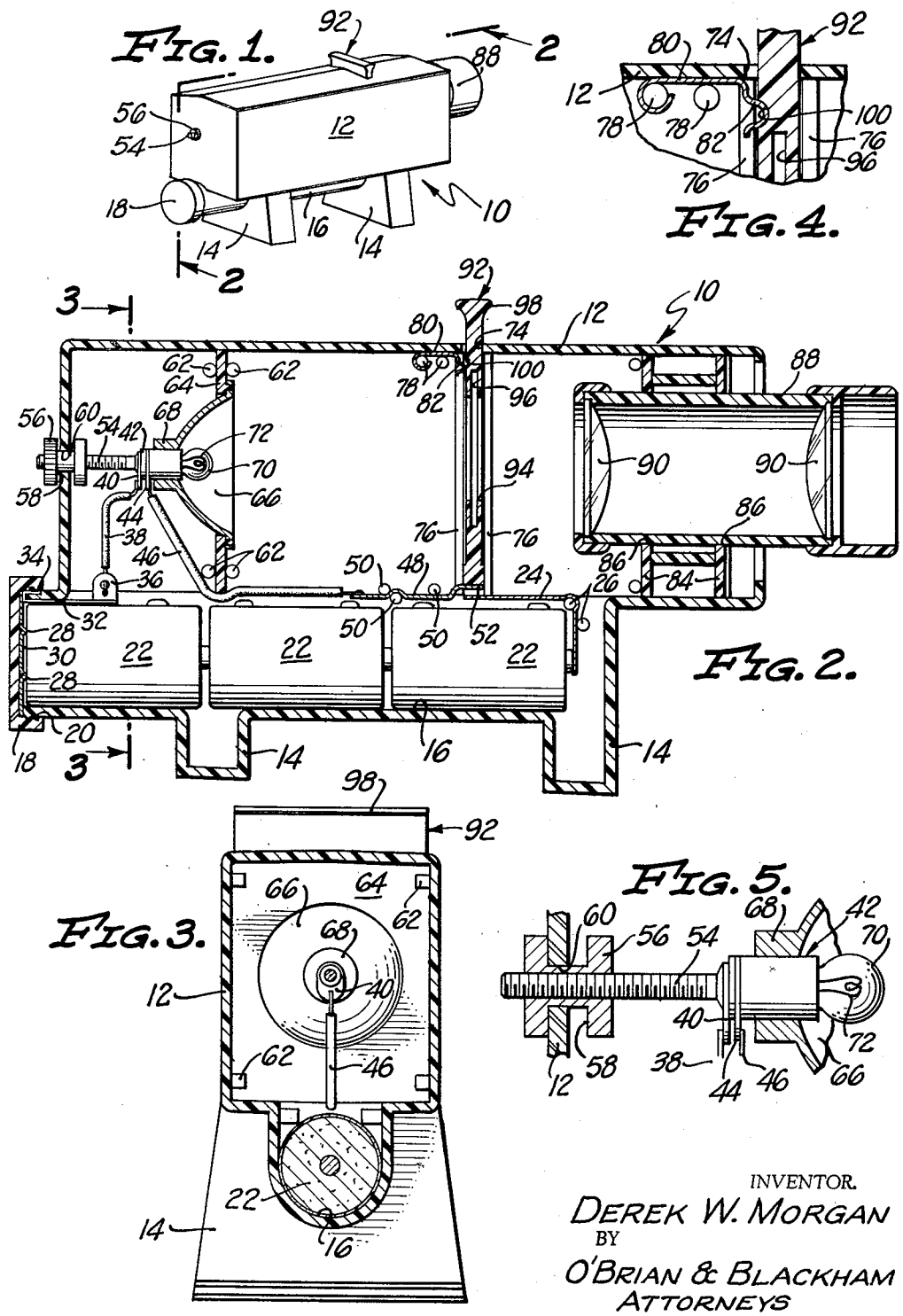
INVENTOR.
DEREK W. MORGAN
BY
O'BRIAN & BLACKHAM
ATTORNEYS United States Patent Office 3,143,035
Patented Aug. 4, 1964

3,143,035
PROJECTOR
Derek W. Morgan, Fullerton, Calif., assignor to Aids, Incorporated, Anaheim, Calif., a corporation of Nevada
Filed Feb. 19, 1962, Ser. No. 174,122
1 Claim. (Cl. 88—24)

This invention pertains to new and improved projectors and more specifically to projectors which are intended to be used in projecting film or glass slides upon a screen.

A wide variety of projectors for such use have been manufactured and sold in the past. As a general rule these prior projectors have tended to be unnecessarily expensive because of the utilization within them of condensing lenses. It will be recognized that such lenses are comparatively expensive in character. These condensing lenses have been used in order to achieve satisfactory illumination of a uniform character against a film or slide used in prior projectors so that the quality of the image achieved in the projectors will be "sharp" and satisfactory.

Various efforts to reduce the costs of projectors have been made by substituting various diffusing means, such as ground glass screens, matted acetate films or the like for condensing lenses. These efforts can be considered more or less satisfactory to a degree but they have not completely solved the problem of providing inexpensive projectors because of the costs of means of this type and because of variations in specific electrical light sources used in common projectors.

An object of the present invention is to provide new and improved projectors which can be manufactured and sold at a comparatively nominal cost as compared with prior projectors as are briefly indicated in the preceding discussion. A further object of the present invention is to provide projectors which can be satisfactorily used so as to produce an image of sufficient sharpness or clarity for normal purposes without the use of condensing lenses or other light diffusing means. A related object of the present invention is to provide electrical projectors for slides and the like which are constructed so that these projectors are capable of being adjusted in order to compensate for differences in various different light bulbs used as sources of illumination.

These and various other objects of this invention, as well as many specific advantages of it will be more fully apparent from a detailed consideration of the remainder of this specification including the appended claim and the accompanying drawing in which:

FIG. 1 is a perspective view of a projector of this invention;

FIG. 2 is a cross-sectional view taken at line 2—2 of FIG. 1;

FIG. 3 is a cross-sectional view taken at line 3—3 of FIG. 2;

FIG. 4 is an enlarged, detail view taken at the same line as FIG. 2 indicating part of this structure shown in FIG. 2; and FIG. 5 is a view similar to FIG. 4 showing another part of the projector illustrated in the preceding figures.

The accompanying drawing is primarily intended so as to clearly illustrate the construction of a presently prefered projector of this invention. From a careful consideration of this drawing and of the remainder of this specification it will be realized that many changes of a routine design or engineering nature may be made in the precise projector shown. Thus, for example, the external appearance of this projector may be changed in accordance with routine design skill or different means may be employed in order to hold or mount the projection lens utilized in this projector. Because of this, this invention is to be considered as being limited to features defined or summarized in the appended claim forming a part of this disclosure.

As an aid to understanding this invention it can be stated in essentially summary form that it concerns projectors, each of which includes a housing, a reflector mounted within this housing, means for holding a slide or film located in front of the reflector, projections lens means mounted in front of the means for holding a film or slide, and a light bulb utilized as a source of light movably mounted in the reflector so that when the projector is utilized the position of the light bulb within the reflector is capable of being adjusted so that the illumination from it is directed by the reflector through a film or slide positioned within holding means and the projection lens employed in such a manner as to obtain a sharp or clear image.

The actual details of this invention will be more fully apparent from a detailed consideration of the accompanying drawing. Here there is shown a projector 10 of the present invention which utilizes a housing 12. This housing 12 may be formed out of any convention material such as present-day thermoplastic resins or the like in one or more sections, and these sections may be secured to one another in accordance with conventional practice through the use of an adhesive or other fastening means. The bottom of the housing 12 is preferably formed so as to include two legs 14 capable of being used in supporting this complete housing 12 and so as to include a cylindrical cavity 16, one end of which is adapted to be closed through the use of a small cap 18 which may be secured to the housing 12 by means of threads 20 or other similar fastening means. This cavity 16 is adapted to hold a series of conventional batteries 22 of so-called flashlight type. When these batteries 22 are located within the cavity 16 the end of the battery 22 furthest remote from the cap 18 bears against a resilient metal spring 24 of substantially an L-shape. This spring 24 is held in place by means of pins 26 located within the housing 12. When the batteries 22 are within the cavity 16, the end of the battery 22 closest adjacent to the cap 18 is resiliently engaged by means of small bump-like projections 28 on a conductive metal spring member 30 which is located within the interior of the base of the cap 18. When the cap 18 is in position this member 30 is in engagement with another metal member 32. This metal member 32 is provided with a substantially U-shaped end 34 which passes around the extremity of the housing 12 upon which the cap 18 is located in such a manner as to engage this extremity and to be held in position by contact with it. The member 32 terminates in the interior of the housing 12 in a small terminal lug 36 which is adapted to be connected to a wire 38.

This wire 38 is connected with a metal terminal 40 which is secured to the base of a conventional electrically non-conductive bulb holder 42. This bulb holder 42 also carries another similar metal terminal 44, and this other terminal 44 is connected to another wire 46 which leads through the interior of the housing 12 and is connected to the end of a further metal spring member 48. This member 48 is held in place by means of other projections 50 within the interior of the housing 12 and terminates in a bent end 52 which is spaced from an extremity of the end of the member 30.

In the projector 10 the base of the bulb holder 42 is attached to a threaded shaft 54 which in turn projects through the interior of a threaded nut 56. This nut 56 is provided with an external peripheral groove 58; the nut 56 is held in place by the walls of the housing 12 around an opening 60 fitting into the groove 58.

Within the interior of the projector 10 there are located further projections 62 which hold an interior wall 64 which in turn holds through the use of an adhesive or other appropriate fastening means (not shown) a conventional parabolic shaped reflector 66 having a cylindrical base 68. In this construction the bulb holder 42 extends through the interior of the base 68 in such a manner as to hold a light bulb 70 capable of being energized by the batteries 22 in a position where the filament 72 of this bulb 70 is located at about the focal point of the reflector 66.

In the projector 10 in front of the reflector 66 there is provided a slot 74 in the housing 12 which leads to between two pairs of guide flanges 76, each of these pairs of guide flanges 76 located at one side of the slot 74. These flanges 76 and the slot 74 are located directly above the bent end 52 on the member 48. At one side of the slot 74 other projections or pins 78 within the housing 12 hold a small metal spring detent member 80 which terminates in a bent end 82 located immediately adjacent to the slot 74.

In the projector 10 adjacent to the end of the housing 12 remote from the reflector 66 there are provided internal support walls 84 having aligned cylindrical openings 86 formed therein. These openings 86 are employed in order to hold a cylindrical barrel 88 which in turn supports two projection lenses 90. For convenience this barrel 88 and the lenses 90 can be referred to as a projection lens or a projection lens system. The position of the barrel 88 may conveniently be adjusted for focusing purposes by merely sliding this barrel 88 within the openings 86. The axes of the lenses 90, the reflector 66, the bulb holder 42 and the shaft 54 are all aligned with one another.

During the use of the projector 10 a slide holder 92 is preferably employed. This slide holder 92 is formed as a flat plate-like member having a centrally located opening 94 formed in it. This opening is traversed by a rectilinear slot 96 extending across the body of the slide holder 92. This slot 96 is preferably shaped so as to be capable of receiving a conventional film or similar slide and holding this slide so that it can not tilt or bend. A small knob 98 is located on the top of the slide holder 92 for the purpose of moving this slide holder 92 through the slot 74 between the guide flanges 76.

When a slide (not shown) is located within the slot 96 the slide holder 92 is moved through the slot 74 generally toward the bottom of the housing 12. The end of this slide holder 92 will come into engagement with the bent end 52 of the member 48. As force is applied to the slide holder 92 it will force this end into engagement with the member 24 so as to establish electrical contact. At the point when such a contact is established the bent end 82 of the detent member 80 will snap into a correspondingly shaped depression 100 in the slide holder 92 so as to locate or hold the the slide holder 92 is position until it is withdrawn through the use of the knob 98. In this position the opening 94 will be in a proper position for the projection of any slide located within the slot 96 through the use of the light bulb 70, and current will be supplied to this light bulb. During such projection the barrel 88 may be moved for focusing purposes.

An important feature of the present invention lies in the discovery that the position of the light bulb 70 should be adjusted during such use or prior to it in order to obtain satisfactory clarity or sharpness of the image created by the projector 10. Such adjustment is accomplished through the rotation of the nut 56 so as to cause the bulb 70 to be moved forwards or backwards with respect to the reflector 66. As this is accomplished the filament 72 within hte bulb 70 will be moved so that this filament can be adjusted in such a manner as to be positioned at or substantially at the focal point of the reflector 66. Such adjustment is necessary in the projector 10 because of the variation in the positions of filaments within light bulbs as such bulbs are normally obtained from conventional manufacturing processes. By virtue of this adjustment within the projector 10 there is no need to use within this projector a conventional condensing lens or the like in order to obtain an image of satisfactory sharpness.

From a consideration of the foregoing those skilled in the art to which this invention pertains will realize that projectors such as a projector 10 may be manufactured and sold at a comparatively nominal cost, and that in addition to being advantageous because of such cost these projectors are distinguishable in that they omit conventional condensing lenses or the like in achieving satisfactory image projection. Because of the nature of this invention it is to be considered as being limited solely by the appended claim forming a part of this disclosure.

What I claim is:

A projector for projecting a film slide which includes:
a housing having a slot formed therein and having guides located leading from said slot;
a film slide holder capable of being moved through said slot to within said guides so as to be located within said housing;
projection lens means movably mounted on said housing at one side of the location of said slide holder within said housing;
a parabolic reflector for reflecting light mounted within said housing on the other side of the position of said slide holder within said housing, the axis of said reflector being aligned with the axis of said projection lens means;
a bulb holder positioned along the axis of said reflector so as to be capable of being moved with respect to the focal point of said reflector;
a light bulb held by said reflector so that the filament of said light bulb is located adjacent to the focal point of said reflector, said housing providing an uninterrupted and uninfluenced light path from said bulb to said slide holder;
means for moving said bulb holder and said light bulb along the axis of said reflector so as to locate the filament of said light bulb at the focal point of said reflector, said means for moving comprising a threaded shaft attached to said bulb holder, said threaded shaft extending along the axis of said reflector and a nut rotatably held by said housing, said shaft being threaded within said nut; and
means for supplying current to said light bulb, said means for supplying current including switch means within a circuit, said switch means being positioned within said housing so as to be engaged by said slide holder when said slide holder is in position within said housing so as to be closed and so as to supply current to said light bulb by engagement with said slide holder.

References Cited in the file of this patent

UNITED STATES PATENTS

| | | |
|---|---|---|
| 778,891 | Rausch | Jan. 3, 1905 |
| 947,256 | Paulson | Jan. 25, 1910 |
| 999,860 | Perry & Eis | Aug. 8, 1911 |
| 2,111,650 | Wells et al. | Mar. 22, 1938 |
| 2,892,274 | Afton | June 30, 1959 |
| 3,064,376 | Fuller | Nov. 20, 1962 |